United States Patent
Clemens et al.

(10) Patent No.: US 9,772,961 B2
(45) Date of Patent: Sep. 26, 2017

(54) COMPUTER SYSTEM, A SYSTEM MANAGEMENT MODULE AND METHOD OF BIDIRECTIONALLY INTERCHANGING DATA VIA MODULE ACCORDING TO THE IPMI STANDARD

(71) Applicant: Fujitsu Technology Solutions Intellectual Property GmbH, München (DE)

(72) Inventors: Martin Clemens, Paderborn (DE); Franz Schlosser, Pöttmes (DE); Karl-Josef Lüttgenau, Borchen (DE)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/649,007

(22) PCT Filed: Jul. 28, 2014

(86) PCT No.: PCT/EP2014/066161
§ 371 (c)(1),
(2) Date: Jun. 2, 2015

(87) PCT Pub. No.: WO2015/028224
PCT Pub. Date: Mar. 5, 2015

(65) Prior Publication Data
US 2016/0179719 A1     Jun. 23, 2016

(30) Foreign Application Priority Data

Aug. 30, 2013  (DE) .................. 10 2013 109 465
Sep. 11, 2013  (DE) .................. 10 2013 109 990

(51) Int. Cl.
*G06F 13/28*     (2006.01)
*G06F 9/54*      (2006.01)
*G06F 11/30*     (2006.01)

(52) U.S. Cl.
CPC ............... *G06F 13/28* (2013.01); *G06F 9/54* (2013.01); *G06F 11/3031* (2013.01); *G06F 11/3065* (2013.01); *G06F 11/302* (2013.01)

(58) Field of Classification Search
CPC ... H04L 43/0817; G06F 11/302; G06F 13/105
See application file for complete search history.

(56) References Cited

U.S. PATENT DOCUMENTS

| 7,308,507 B1 | 12/2007 | Braduke |
| 9,043,527 B2 * | 5/2015 | Bhatia ................ G06F 13/4221 710/313 |

(Continued)

FOREIGN PATENT DOCUMENTS

| DE | 10 2007 039 156 A1 | 4/2008 |
| WO | 2005/096143 A1 | 10/2005 |

OTHER PUBLICATIONS

"Backplane Controller with USB, SGPIO, SES, IBPI and IPMI," AMI MG9081, American Megatrends, Inc., 2012, Ver 0.2.

(Continued)

*Primary Examiner* — Tammara Peyton
(74) *Attorney, Agent, or Firm* — Fujitsu Patent Center

(57) ABSTRACT

A computer system includes a system component with at least one expansion bus and at least one processor coupled to the at least one expansion bus and executes program code of at least one operating system. The computer system also includes a system management module arranged on the system component and at least one memory. The system management module is coupled to the at least one expansion bus and the at least one expansion bus allows direct access to the at least one memory. The system management module has an interface that implements a protocol stack having a bidirectional transport layer used to provide a predetermined (Continued)

shared memory area of the at least one memory to interchange data with the operating system.

20 Claims, 4 Drawing Sheets

(56) References Cited

U.S. PATENT DOCUMENTS

| | | |
|---|---|---|
| 9,519,527 B1 * | 12/2016 | Bhatia .................... G06F 9/541 |
| 2007/0005828 A1 | 1/2007 | Diamant |
| 2007/0011491 A1 | 1/2007 | Govindarajan et al. |
| 2007/0088974 A1 | 4/2007 | Chandwani et al. |
| 2008/0005748 A1 | 1/2008 | Mathew et al. |
| 2009/0025008 A1 | 1/2009 | Hung |
| 2011/0258410 A1 | 10/2011 | Lambert et al. |
| 2012/0042307 A1 | 2/2012 | Shao |

OTHER PUBLICATIONS

"Intelligent Platform Management Interface," Wikipedia: http://en.wikipedia.org/w/index.php?oldid=557398764.

"Intelligent Platform Management Interface," IPMI 2.0 Specification, Document Revision 1.0, Feb. 12, 2004, Intel Hewlett-Packard NRC Dell.

"A Method of Improving the Communication Mechanism Between UEFI and BMC," www.ip.com, PriorArtDatabase, IPCOM000217111D, May 3, 2012.

UPOA—Japanese Office Action dated May 9, 2017 for Japanese Patent Application No. JP2016-535388, with English translation.

* cited by examiner

COMPUTER SYSTEM, A SYSTEM MANAGEMENT MODULE AND METHOD OF BIDIRECTIONALLY INTERCHANGING DATA VIA MODULE ACCORDING TO THE IPMI STANDARD

TECHNICAL FIELD

This disclosure relates to a computer system comprising a system component with at least one processor arranged thereon and a system management module arranged thereon and at least one memory. The disclosure also relates to a system management module that monitors a computer system with at least one processor and to a method of bidirectionally interchanging data between an operating system and a system management module of a computer system.

BACKGROUND

Computer systems of the above-mentioned type are well known. In particular, so-called "server systems" which often operate without interruption and not under the direct supervision of a user are often provided with a so-called "system management module" (also known by the English term "Baseboard Management Controller" (BMC)) to monitor operation of the computer system. In addition to the actual monitoring, system management modules also allow administrative tasks to be carried out, for example, updating of software components and performance of settings. The system management module generally connects to a remote system management server via a network interface to interchange data relating to the operating state of the computer system and allow an administrator to log onto the system management module of the computer system being monitored independently of the operating system of the computer system.

In addition to the above-mentioned remote access, a system management module provides data for agent applications possibly also running under the control of a local operating system of the computer system. For example, agents may retrieve current monitoring parameters, for example, operating temperatures and other operating data, from the system management module.

To interchange data between an operating system running on a local processor of the computer system and the system management module, use is generally made of the so-called "Keyboard Controller Style" (KCS) protocol according to the "Intelligent Platform Management Interface" (IPMI) standard, version 2.0, revision 1.0 of Feb. 12, 2004 from Intel, Hewlett Packard, NEC and Dell.

The problem with the above-mentioned approach is that use of the KCS protocol allows only a relatively narrow bandwidth. In particular, operation of interchanging relatively large volumes of data, as occurs, in particular, in newer, particularly powerful system management modules, therefore requires relatively long data transmission times.

It could therefore be helpful to provide apparatus and methods which speed up data interchange between an operating system and a local system management module of a computer system.

SUMMARY

We provide a computer system including a system component with at least one expansion bus; at least one processor coupled to the at least one expansion bus and that executes program code of at least one operating system; a system management module arranged on the system component; and at least one memory, wherein the system management module is coupled to the at least one expansion bus and the at least one expansion bus allows direct access to the at least one memory; and the system management module has an interface that implements a protocol stack having a bidirectional transport layer which is used to provide a predetermined shared memory area of the at least one memory to interchange data with the operating system.

We also provide a system management module that monitors a computer system with at least one processor that executes an operating system, wherein 1) the system management module acquires comprehensive data relating to an operating state of the computer system or memory dumps of at least one part of a main memory of the computer system, during operation of the computer system, and 2) data from a predetermined shared memory area are made available to the processor via an interface of the system management module and at least one expansion bus coupled to the processor and to the system management module.

We further provide a method of bidirectionally interchanging data between an operating system and a system management module of a computer system including providing, by a software component of the operating system or the system management module, data to be interchanged in a predetermined shared memory area which can be addressed via an interface of the system management module and an expansion bus of the computer system; signaling that data are available for retrieval in the shared memory area; and reading the shared memory area by the system management module or the software component of the operating system.

LIST OF REFERENCE SYMBOLS

Figure 1:
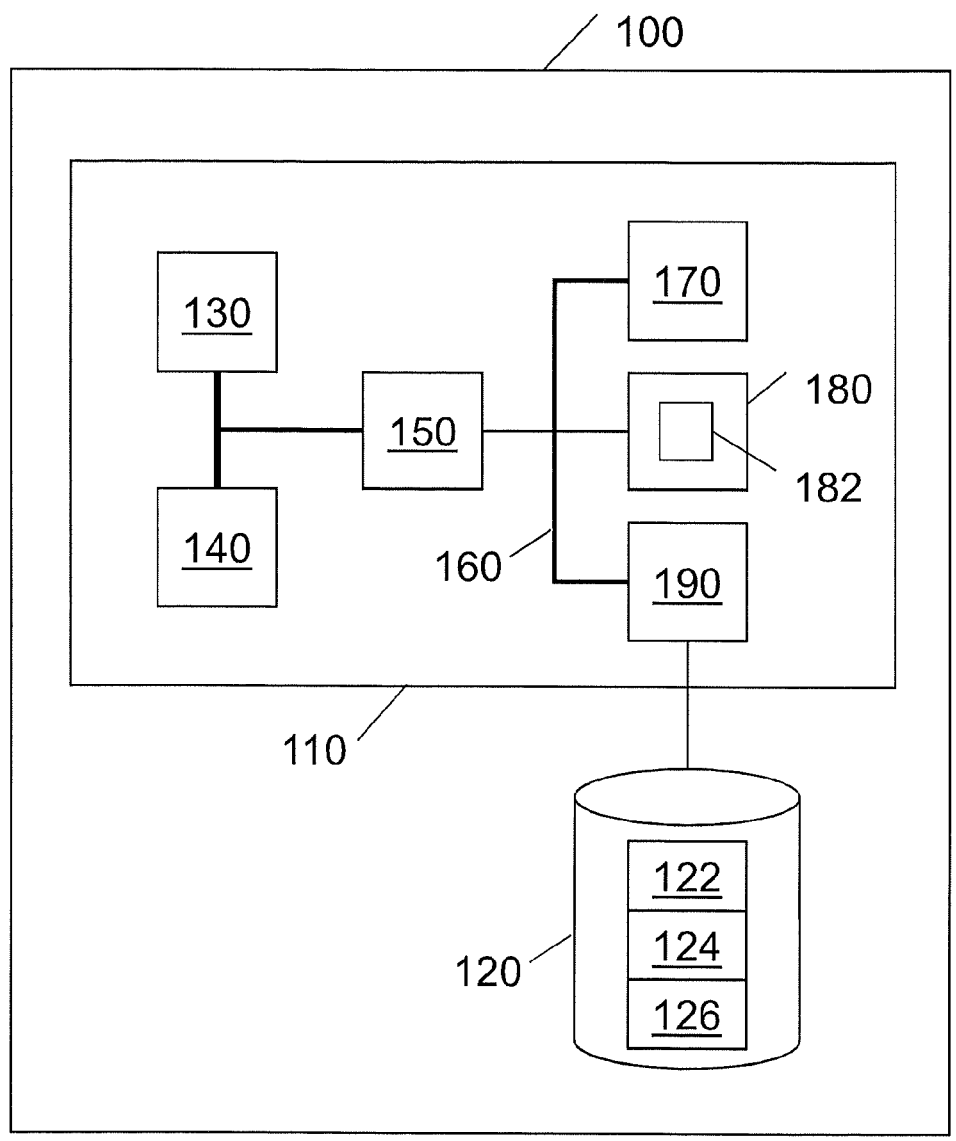
FIG. 1 shows a computer system according to one example.

100 Computer system
110 System component
120 Mass memory
122 Operating system
124 Software driver
126 Application software
130 Processor
140 Main memory
150 Chipset
160 Expansion bus
170 Graphics component
180 System management module
182 Internal memory
190 Mass memory controller
210 Software component
220 Interface controller
230, 232, 234 Function
240 Shared memory area
250, 252, 254, 256 Queue
260 First register set
270 Second register set 300 Protocol stack
302 First address space
304 Second address space
306 Third address space
310 KCS interface
312 IPMI KCS kernel driver
314 IPMI KCS adapter
320 Interface
322 First functional unit
324 Second functional unit
326 Third functional unit
330 Standard driver
340 Adapter module
350 First application
352 Daemon process
354 IPMI handler module
356 File transfer module
358 Software module
360 CIM provider
362 SNMP agent
364 Management tool
370 Second application
372 Firmware update component
374 IPMI handler module
376 File transfer module
400 Protocol stack
430 Kernel driver
440 Adapter module

DETAILED DESCRIPTION

Our computer system comprises a system component with at least one expansion bus and at least one processor coupled to the at least one expansion bus and intended to execute program code of at least one operating system. The computer system also comprises a system management module arranged on the system component and at least one memory. In this case, the system management module is coupled to the at least one expansion bus, the at least one expansion bus allowing direct access to the at least one memory. In this case, the system management module has an interface to implement a protocol stack having a bidirectional transport layer used to provide a predetermined shared memory area of the at least one memory to interchange data with the operating system.

In that computer, an expansion bus of the computer system is used to interchange data between an operating system and a system management module, the expansion bus allowing direct access to at least one memory. The use of the expansion bus makes it possible for both the system management module and the processor, on which the operating system is executed, to interchange data with a wide bandwidth and in a large amount via a predetermined shared memory area. For this purpose, the system management module provides a bidirectional interface, via which software components of an operating system to implement a protocol stack can access the shared memory area.

One advantage of the described architecture is, inter alia, that most existing operating systems provide mechanisms to access shared memory areas by devices connected to an expansion bus. This makes it possible to generally access such a memory area directly from an address space for applications executed under the operating system, that is to say without providing special kernel drivers. On the basis of such basic drivers of the operating system, further protocol levels can be added in the application layer to create an application-specific multi-protocol stack. This makes it possible to provide a particularly flexible interface between a system management module and various applications executed under the operating system.

The possibility of bidirectionally interchanging data via the expansion bus also enables a multiplicity of new application scenarios. In particular, control software running on a microcontroller of the system management module can actively start access to data managed by the operating system or can transmit messages to applications running under the operating system. In other words, access with equal rights takes place either by the system management module or by the operating system. Technically, this results in true concurrency of the control software of the system management module and the operating system. Therefore, for many applications, it is no longer necessary to provide agents which run under the operating system and give rise to a comparatively resource-intensive active query (also known as "polling") of the system management module.

Use of a local expansion bus simultaneously avoids problems as might arise, for example, when using network interfaces for local communication. In particular, the risk of possible bridging between a management network and a further company network and the associated security risks can be avoided.

Preferably, the at least one expansion bus comprises at least one bidirectional point-to-point connection, in particular at least one PCI Express (PCIe) connection, between a chipset of the system component and the system management module. Hardware components that establish PCIe connections are generally already integrated in a chipset of a system component. In this case, the associated PCIe protocol allows shared memory areas to be provided for different devices. Connecting a system management module directly to a PCIe connection therefore makes it possible to interchange data via a memory area shared by the processor and the system management module.

The predetermined shared memory area may be part of an integrated memory of the system management module. Alternatively, the predetermined shared memory area may be part of a main memory of the computer system. If part of an integrated memory of the system management module is used as the shared memory area, it is possible to largely dispense with copying data acquired by the system management module. If, in contrast, part of a main memory of the computer system is used, a relatively large, contiguous memory area is available for joint use.

We also provide a system management module that monitors a computer system with at least one processor to execute an operating system, in which the system management module acquires comprehensive data relating to an operating state of the computer system during operation of the computer system. For example, the system management module may be set up to compile memory dumps of at least one part of a main memory of the computer system or comprehensive diagnostic reports. In this case, data from a predetermined shared memory area are made available to the processor via an interface of the system management module and at least one expansion bus which is coupled to the processor and to the system management module. There, the data can be processed by a software component of the operating system or other system components of the computer system.

Such use allows a computer system to be monitored, in particular, without agents and largely independently of an operating system, in particular without using constantly active monitoring software, by a system management module. In this case, further processing of the acquired data by a software module of the computer system can be initiated by the system management module, with the result that it becomes possible to monitor the computer system without agents.

We further provide a method of bidirectionally interchanging data between an operating system and a system management module of a computer system. The method comprises the following steps:

providing, by a software component of the operating system or the system management module, data to be interchanged in a predetermined shared memory area which can be addressed via an interface of the system management module and an expansion bus of the computer system;

signaling that data are available for retrieval in the shared memory area; and reading the shared memory area by the system management module or the software component of the operating system.

The above-mentioned method steps make it possible to bidirectionally interchange data in a computer system with a system management module with a wide transmission bandwidth. Such a method is suitable, inter alia, to implement monitoring systems without agents.

Further advantages are disclosed in the following detailed description of examples. Our computer systems, system management modules and method are described in detail below using different examples with reference to the attached figures. In different figures, the same or similar components are sometimes provided with the same reference symbols.

FIG. 1 schematically shows the structure of a computer system 100. The computer system 100 comprises a system component 110 in the form of a system board and a non-volatile mass memory 120 in the form of a hard disk drive. The computer system 100 may comprise further components which are not illustrated, however, in FIG. 1 for reasons of clarity.

In the example, a processor 130, a main memory 140 and a chipset 150 are arranged on the system component 110. The processor 130, the main memory 140 and the chipset 150 connect to one another via one or more bus systems. For example, the processor 130, the main memory 140 and the chipset 150 connect to one another via a so-called Quick Path Interconnect (QPI) bus.

Expansion components connected to the chipset 150 via an expansion bus 160 are also arranged on the system component 110. The expansion bus 160 is, in particular, a so-called PCI Express (PCIe) bus system having a plurality of serial point-to-point connections largely independent of one another. In the example illustrated in FIG. 1, a graphics component 170, a system management module 180 and a mass memory controller 190 connect to the chipset 150 via the expansion bus 160.

The system management module 180 comprises an internal memory 182 which stores data acquired by the system management module 180. The system management module 180 can also contain further components such as, in particular, a microcontroller, a further graphics component and/or a network interface which are not illustrated, however, in FIG. 1 for reasons of clarity.

Various software components for execution by the processor 130 are stored in the mass memory 120. In particular, an operating system 122, software drivers 124 and application software 126 are stored in the mass memory 120. During their execution by the processor 130, the software components stored in the mass memory 120 are used, in particular, to establish bidirectional communication with the system management module 180, as explained in detail using the following figures.

Figure 2:
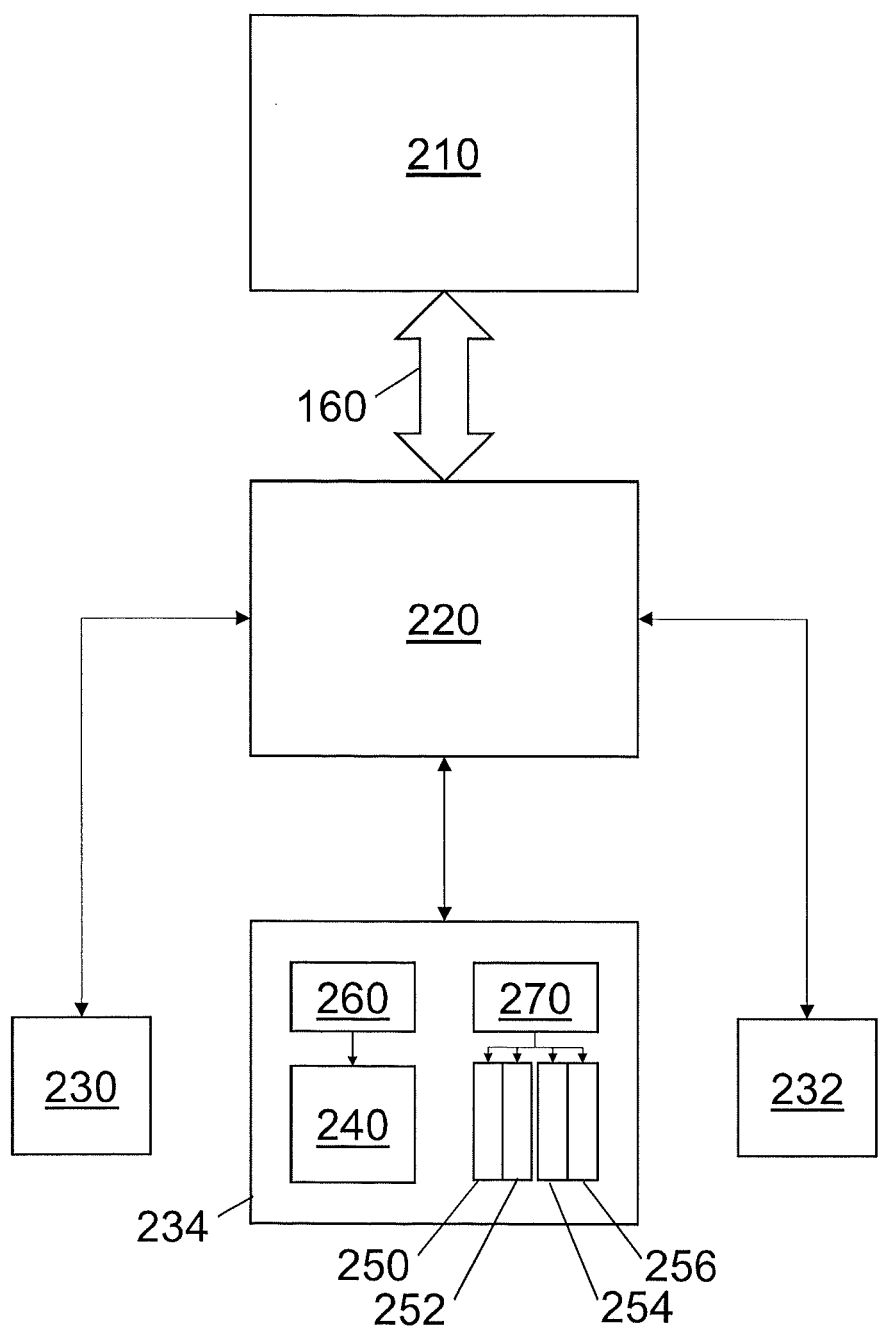
FIG. 2 shows a schematic illustration of access to a shared memory area.

FIG. 2 schematically shows the components of the computer system 100 involved in interchanging data between a software component 210 executed on the processor 130 and the system management module 180.

The software components 210 of the host system which run on the processor 130, for example, part of the operating system 122, software drivers 124, application software 126 or BIOS routines of firmware of the computer system 100 which are possibly provided to access the expansion bus 160, access an interface controller 220 of the system management module 180 via the expansion bus 160. The interface controller 220 is the implementation of a PCIe interface according to the current PCI Express standard.

Different functions 230, 232 and 234 are provided via the interface controller 220 according to the PCIe standard. The functions 230 and 232 are standard functions not described in detail. For example, the function 230 is a function that accesses a further graphics component present in the system management module 180. The function 232 is, for example, a function that accesses a network controller of the system management module 180.

The third function 234 is used to provide bidirectional communication between the software component 210 and the system management module 180. The function is based on a modified basic driver of the system management module 180 that accesses the PCIe interface. A shared memory area 240 and a total of four queues 250, 252, 254 and 256 are implemented via the driver. The shared memory area 240 is part of the internal memory 182.

The shared memory area 240 can be addressed using a first register set 260. The first register set 260 can be used, in particular, to interchange a start address of data stored in the shared memory area 240 for interchange between the system management module 180 and the software component 210. The queues 250, 252, 254 and 256 can be addressed using a second register set 270. The queues 250 and 252 may be used to transmit messages from the software component 210 to the system management module 180. Conversely, the queues 254 and 256 may be used to interchange messages from the system management module 180 to the software component 210. For example, the queues 250 and 254 and a respective associated ring buffer in the memory area 240 may be used in each direction for bidirectional communication between the operating system 122 and the system management module 180. In contrast, the other queues 252 and 256 and accordingly associated ring buffers can be used for communication between a so-called System Management Interface (SMI) handler and the system management module 180. Generally, as many ring buffers and queues as there are parallel data transmission interfaces and directions should be provided. Providing different queues for the two possible communication directions makes it possible for both the operating system 122 and the system management module 180 to start communication independently of one another and therefore with equal rights.

The queues 250, 252, 254 and 256 are used, in particular, to interchange instructions. The exact type of instructions and data interchanged is application-specific. To enable the greatest possible flexibility when implementing different applications, a multi-layer protocol stack is used, which protocol stack makes it possible to interchange data between individual applications and the system management module 180.

Figure 3:
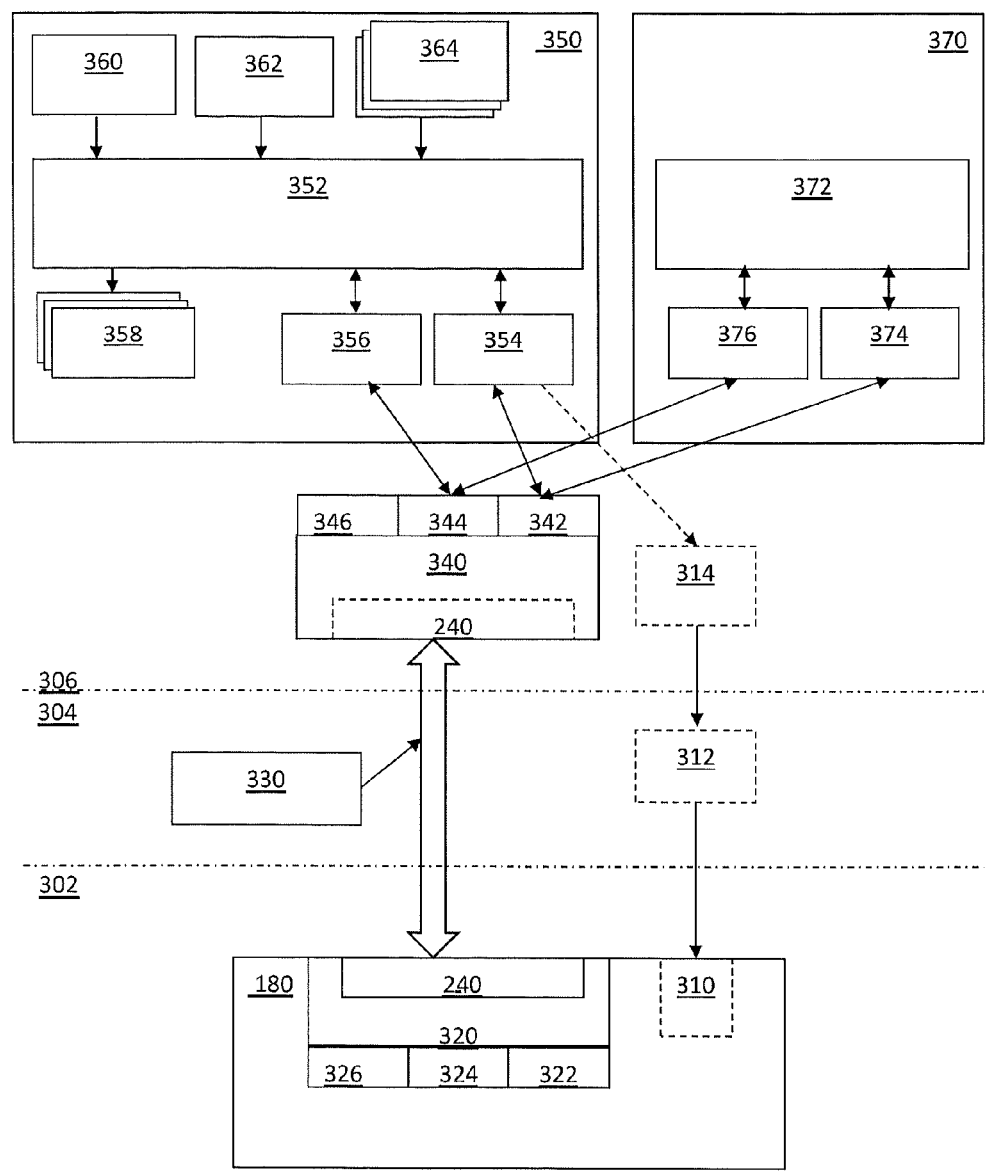
FIG. 3 shows a protocol stack according to a first example.

FIG. 3 shows a protocol stack 300 according to a first example.

FIG. 3 illustrates, from bottom to top, three address spaces 302, 304 and 306 which are delimited from one another. The first address space 302 is associated with the system management module 180. The second address space 304 is visible only from a core of the operating system 122 and is used, inter alia, to execute so-called kernel mode drivers. The third address space 306 is visible to applications running under the operating system 122.

For better understanding, an implementation of the IPMI KCS standard which is known per se is first of all described using FIG. 3, which implementation is illustrated using dashed lines in FIG. 3. In the example described, such an implementation is likewise provided as stated below for reasons of backward compatibility.

To implement the IPMI KCS standard, the system management module 180 has a KCS interface 310. The KCS interface 310 may be addressed, for example, using special hardware registers of the system management module 180. This is generally possible only from the kernel mode. Accordingly, an IPMI KCS kernel driver 312 adapted to the standard of the KCS interface 310 of the system management module 180 runs in the second address space 304. A first application 350 which runs in the third address space 306 can use an IPMI KCS adapter 314 to access functions provided by the IPMI KCS kernel driver 312 and can therefore indirectly send data and instructions to the system management module 180 or can retrieve data from the latter.

Using the IPMI KCS adapter 314 makes it possible for the first application 350 to access functions of the system management module 180 largely independently of the installed IPMI KCS kernel driver 312 and the operating system used. However, the described approach is only unidirectional and restricted in terms of its bandwidth on account of the KCS protocol used.

To improve access possibilities, a shared memory area 240 of the internal memory 182 of the system management module 180 is therefore directly mapped to the third address space 306 of the operating system 122 in the example according to FIG. 3. For this purpose, the system management module 180 provides an interface 320 which maps selected areas of the internal memory 182 of the system management module 180 to a shared memory area 240 according to the PCIe standard. To select the memory area to be mapped and to transmit instructions and metadata, the interface 320 comprises functional units 322, 324 and 326 for providing different standard functions. In the example, the first functional unit 322 is used to provide IPMI functions, the second functional unit 324 is used to provide general file functions and the third functional unit 326 is used to provide manufacturer-specific functions, for example, to configure the system management module 180.

The shared memory area 240 can be mapped to the third address space 306 by using standard functions of the operating system core or of a standard driver 330. For this purpose, it is not necessary to execute an additional or hardware-specific kernel driver in the second address space 304. Instead, applications under the Linux operating system can access such memory areas 240 as standard using the path /dev/mem/ or the kernel function mmap( ). Under the Windows operating system, the standard driver 330 is used to address shared memory areas 240 of PCIe expansion components.

An adapter module 340 implemented in the third address space 306 can therefore directly access data in the system management module 180 with a wide bandwidth. There is no need to install a special kernel driver for this purpose. In addition, data transmission rates of 10 MB/s and more, for example, in both directions are possible with the described approach. The data are provided via three application programming interfaces (API) 342, 344 and 346 used to address the respective corresponding functional units 322, 324 and 326 of the interface 320. The interface 320 and the adapter module 340 together provide a bidirectional transport layer based on the shared memory area 240 for the protocol stack 300. A logical layer that provides different protocols, inter alia the programming interfaces 342, 344 and 346, sits on the transport layer. The division into two layers makes it possible to implement further protocols by supplementing the logical layer with corresponding functional units and/or programming interfaces without having to change the transport layer itself.

The first application 350 to implement higher protocol layers sits on the adapter module 340. The first application 350 implements, for example, a so-called "daemon process" 352 which provides various basic services for server management. For this purpose, the first application 350 comprises, inter alia, a so-called IPMI handler module 354 that accesses functions of the application programming interface 342 of the adapter module 350 in accordance with the standards. Therefore, existing applications 350 can be used without change.

The first application 350 additionally comprises a file transfer module 356 which makes it possible, in particular, to transmit files to the system management module 180 with a wide bandwidth. To carry this out, the application programming interface 344 provides, in particular, functions such as open( ), write( ), read( ) or append( ) which functionally correspond to kernel functions that access files of a conventional mass memory. In addition, yet further software modules 358 (which are not described in detail here) that provide other functions may be included in the application 350.

If no interface 320 is available on the part of the system management module 180 or no suitable adapter module 340 or no standard driver 330 is available on the part of the operating system 122, the IPMI handler module 354 accesses the KCS interface 310 via the conventional IPMI KCS adapter 314. In this respect, the IPMI handler module 354 detects the occurrence of a fault, for example, or the use of an incompatible system management module 180 and diverts corresponding requests from the daemon process 352 via the backward-compatible, but less powerful KCS interface 310.

Software modules that provide individual services run above the daemon process 352. These are a so-called CIM provider 360 which provides data according to the "Common Information Model" standard, an agent 362 according to the Simple Network Management Protocol (SNMP) and further management tools 364 which are not described in detail. By the protocol stack 300, the daemon process 352 and the software modules 360, 362 and 364 can access the information in the system management module 180 in unchanged form in a manner known per se using the IPMI handler module 354. To implement the described interface via the expansion bus, the operating system 122 must therefore only provide an adapter module 340. The system management module 180 only needs to implement the interface 320. The driver 330 in between ensures only access to the shared memory area 240 in accordance with PCI express and is therefore already part of customary operating systems, as stated above.

In addition to the first application 350, a second application 370 which likewise accesses one or more of the application programming interfaces 342, 344 or 346 of the adapter module 350 runs in the third address space 306. In this case, the adapter module 340 is used to control parallel access to the system management module 180, with the result that there is no mutual interference in the applications 350 and 370. This is a firmware update component 372 which accesses the application programming interfaces 342 and 344 for this purpose via an IPMI handler module 374 and a file transfer module 376. The firmware update component 372 is used, for example, to store and set up a firmware component of the system management module 180 or a BIOS component of the computer system. Such applications benefit particularly from the increased transmission bandwidth of the new interface 320 and the associated adapter module 340.

Figure 4:
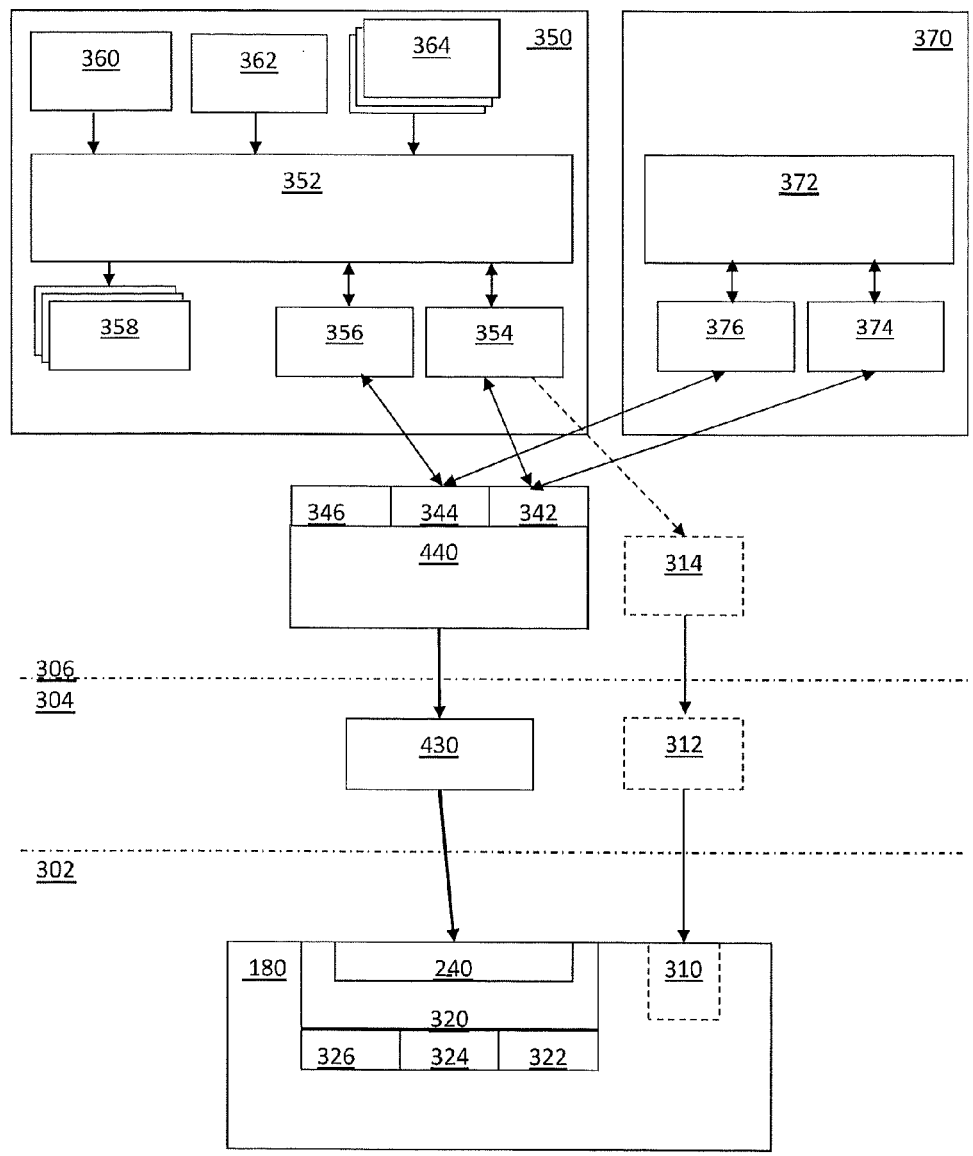
FIG. 4 shows a protocol stack according to a second example.

FIG. 4 shows a further protocol stack 400 according to a further example. The protocol stack 400 comprises substantially the same components as the protocol stack 300 according to FIG. 3. Differing from this, the shared memory area 240 is not directly mapped to the third address space 306. This is generally not possible without problems in the case of fully virtualized hardware systems, for example.

To nevertheless enable communication between an operating system 122 and the system management module 180 of the physical hardware platform at a high data rate, a special kernel driver module 430 is provided in the example according to FIG. 4, which module runs directly in the address space 304 of an operating system 122, for example, ESXi, and has access to the shared memory area 240.

An adapter module 440 which can transmit data to the kernel driver 430 or can retrieve data from the latter using special function calls runs inside the third address space 306. Therefore, there is no need for the adapter module 440 to directly write to the shared memory area 240, with the result that the described protocol stack 400 is also suitable for those operating systems in which direct access to shared memory 240 from the address space 306 for applications is not allowed or desired.

In addition to increasing the data transmission rate between software components of the operating system 122 and the system management module 180, the new interface 320 and the adapter modules 340 and 440 also allow so-called agent-less monitoring systems to be implemented. For this purpose, monitoring processes running inside the system management module 180 can automatically compile comprehensive data and make the latter available to the operating system 122 or other system components via the shared memory area 240. An application 350 or 370 running inside the third address space 306 of the operating system 122 can then be advised, via the bidirectional interface 320, that the system management module 180 has compiled corresponding data. Triggering an interrupt request by the system management module 180 is suitable for this purpose, for example. In this case, it is possible to dispense with active monitoring by so-called agents.

Although our computer system, system management modules and methods are described above using bidirectional communication between a system management module 180 and software components 210 of an operating system 122, the interface 320 is also suitable for communication with other components of the computer system 100. In particular, a so-called System Management Interface (SMI) handler to execute special program code in the so-called System Management Mode (SMM) can directly access the interface 320. Communication between BIOS software and the system management module 180 is likewise possible, with the result that it is possible, for example, for the system management module 180 to update the BIOS firmware with a wide bandwidth.

The invention claimed is:

1. A computer system comprising:
a system component with at least one expansion bus;
at least one processor coupled to the at least one expansion bus and that executes program code of at least one operating system;
a system management module arranged on the system component; and
at least one memory,
wherein
the system management module is coupled to the at least one expansion bus;
the at least one expansion bus allows direct access to the at least one memory;
the system management module has an interface that is configured to make a predetermined shared memory area of the at least one memory available to the processor and implements a protocol stack having a bidirectional transport layer which is used to provide the predetermined shared memory area of the at least one memory to interchange data with the operating system; and
the protocol stack comprises at least one adapter module and a handler module, wherein the at least one adapter module directly accesses the predetermined shared memory area from an address space for applications of the operating system, and the handler module is executed in the address space for applications of the operating system and provides an interface according to the IPMI standard, wherein the handler module accesses a programming interface provided by the adapter module and intended to interchange data with the system management module.

2. The computer system according to claim 1, further comprising a daemon process carried out by the operating system and intended to provide application-specific interfaces for communicating with the system management module.

3. The computer system according to claim 1, wherein the at least one expansion bus comprises at least one bidirectional point-to-point connection or at least one PCIe connection, between a chipset of the system component and the system management module.

4. The computer system according to claim 1, wherein the predetermined shared memory area is part of an internal memory of the system management module.

5. The computer system according to claim 1, wherein the predetermined shared memory area comprises a first subarea that provides a buffer memory to transmit data from the operating system to the system management module and a second subarea that provides a buffer memory to transmit data from the system management module to the operating system.

6. The computer system according to claim 1, further comprising at least one communication register that implements at least one first queue to transmit data from the operating system to the system management module and a second communication register for at least one second queue to transmit data from the system management module to the operating system.

7. The computer system according to claim 1, wherein a pending data transmission is signaled by triggering at least one interrupt request.

8. The computer system according to claim 1, wherein the system management module is configured to monitor the computer system while the at least one processor executes the operating system, wherein 1) the system management module acquires comprehensive data relating to an operating state of the computer system or memory dumps of at least one part of a main memory of the computer system, during operation of the computer system, and 2) data from the predetermined shared memory area are made available to the processor via the interface of the system management module and the at least one expansion bus coupled to the processor and to the system management module.

9. A computer system comprising:
a system component with at least one expansion bus;
at least one processor coupled to the at least one expansion bus and that executes program code of at least one operating system;
a system management module arranged on the system component; and
at least one memory,
wherein
the system management module is coupled to the at least one expansion bus;
the at least one expansion bus allows direct access to the at least one memory;
the system management module has an interface that implements a protocol stack having a bidirectional transport layer which is used to provide a predetermined shared memory area of the at least one memory to interchange data with the operating system; and
the protocol stack comprises at least one adapter module, a kernel driver, and a handler module, wherein the at least one adapter module is executed in an address space for applications of the operating system and accesses the kernel driver using predetermined functions, and the kernel driver is executed in a protected address space of the operating system and accesses the predetermined shared memory area, and the handler module is executed in the address space for applications of the operating system and provides an interface according to the IPMI standard, wherein the handler module accesses a programming interface provided by the adapter module and intended to interchange data with the system management module.

10. The computer system according to claim 9, further comprising a daemon process carried out by the operating system and intended to provide application-specific interfaces for communicating with the system management module.

11. The computer system according to claim 9, wherein the at least one expansion bus comprises at least one bidirectional point-to-point connection or at least one PCIe connection, between a chipset of the system component and the system management module.

12. The computer system according to claim 9, wherein the predetermined shared memory area is part of an internal memory of the system management module.

13. The computer system according to claim 9, wherein the predetermined shared memory area is part of a main memory of the computer system.

14. The computer system according to claim 9, wherein the predetermined shared memory area comprises a first subarea that provides a buffer memory to transmit data from the operating system to the system management module and a second subarea that provides a buffer memory to transmit data from the system management module to the operating system.

15. The computer system according to claim 9, further comprising at least one communication register that implements at least one first queue to transmit data from the operating system to the system management module and a second communication register for at least one second queue to transmit data from the system management module to the operating system.

16. The computer system according to claim 9, wherein a pending data transmission is signaled by triggering at least one interrupt request.

17. The computer system according to claim 9, wherein the system management module is configured to monitor the computer system while the at least one processor executes the operating system, wherein 1) the system management module acquires comprehensive data relating to an operating state of the computer system or memory dumps of at least one part of a main memory of the computer system, during operation of the computer system, and 2) data from the predetermined shared memory area are made available to the processor via the interface of the system management module and the at least one expansion bus coupled to the processor and to the system management module.

18. A method of bidirectionally interchanging data between an operating system and a system management module of a computer system comprising:
providing, by a software component of the operating system or the system management module, data to be interchanged in a predetermined shared memory area which can be addressed via an interface of the system management module and at least one expansion bus of the computer system;
signaling that data are available for retrieval in the shared memory area; and
reading the shared memory area by the system management module or the software component of the operating system; wherein
the system management module is coupled to the at least one expansion bus and the at least one expansion bus allows direct access to the at least one memory;
the system management module has an interface that implements a protocol stack having a bidirectional transport layer which is used to provide a predetermined shared memory area of the at least one memory to interchange data with the operating system; and
the protocol stack comprises at least one adapter module, a kernel driver, and a handler module, wherein the adapter module is executed in an address space for applications of the operating system and accesses the kernel driver using predetermined functions, and the kernel driver is executed in a protected address space of the operating system and accesses the predetermine shared memory area and the handler module is executed in the address space for applications of the operating system and provides an interface according to the IPMI standard, wherein the handler module accesses a programming interface provided by the adapter module and intended to interchange data with the system management module.

19. The method according to claim 18, further comprising acquiring comprehensive data or a memory dump of at least one part of a main memory of the computer system, in an internal memory by system management modules; and
at least partially providing said data in the shared memory area, and reading the data provided by the software component executed on the at least one processor under control of the operating system, via the expansion bus.

20. The method according to claim 19, wherein the shared memory area is part of the internal memory of the system management module.

\* \* \* \* \*